United States Patent
Dowdey

[15] 3,658,371
[45] Apr. 25, 1972

[54] PINE CONE GATHERING IMPLEMENT

[72] Inventor: Thomas W. Dowdey, 222 Alexandria Drive, West Columbia, S.C.

[22] Filed: Jan. 29, 1970

[21] Appl. No.: 6,659

[52] U.S. Cl. ........................................... 294/61
[51] Int. Cl. ........................................... B08b 1/00
[58] Field of Search ............ 56/400.17; 294/52, 56, 55.5, 294/61, 126

[56] References Cited

UNITED STATES PATENTS

| | | | |
|---|---|---|---|
| 1,489,851 | 4/1924 | Rombauer | 249/61 |
| 3,130,533 | 4/1964 | Huegel et al. | 56/400.17 |

Primary Examiner—Evon C. Blunk
Assistant Examiner—I. Kenneth Silverman
Attorney—Townsend M. Belser, Jr.

[57] ABSTRACT

A pine cone gathering implement comprising a handle of suitable length and a gathering mechanism having a plurality of outwardly projecting resilient finger members, the inner ends of which are gathered together and secured to the handle by a bracket. Projecting outer ends of the fingers all diverge in a single plane at an angle exceeding 3° and are tied together by a tension bar located intermediate their ends at a specified distance from the bracket. The free ends of the fingers are so spaced apart as to provide a pocket into which pine cones are forced and retained.

3 Claims, 3 Drawing Figures

PATENTED APR 25 1972 3,658,371

INVENTOR
THOMAS W. DOWDEY

BY Townsend M. Belser, Jr.
ATTORNEY

PINE CONE GATHERING IMPLEMENT

BACKGROUND OF THE INVENTION

This invention relates to an improved and novel hand implement for gathering objects lying upon the ground, and more specifically to a long-handled implement so constructed that the user thereof may conveniently pick up pine cones lying upon the ground without bending over and accumulate a number of such objects in the device until such time as they can be conveniently dumped into a suitable bag or other container.

A number of gathering and collecting devices equipped with a long handle to allow the user to pick up objects off of the ground without bending over are found in the art. However, because of the unusual shape and configuration of pine cones, none of those devices are suitable for picking up and accumulating pine cones. One such device is the well known pick having one or more prongs or tines arranged at one end of a handle so as to stab paper lying upon the ground. Although a pine cone may occasionally be picked up by such a stabbing device, it is difficult and time consuming to pierce the hard center portion of a pine cone in exactly the right place so as to impale it upon a prong. Because of the lack of an adequate gathering device to date, pine cones are usually either raked up into a pile and picked up by hand in a group or they are picked up one by one by a person bending over to reach each cone. From reasons of safety, the collection and removal of pine cones from a lawn or other area is absolutely essential before the grass in such area may be cut by rotary or other power mowers. Prior to the applicant's invention the foregoing hand methods were the only effective ways to pick up pine cones. It is therefore one object of my invention to meet the need which has long existed for a convenient gathering implement or tool of a construction that will permit efficient collection and accumulation of all types and sizes of pine cones, whether in a closed or open condition.

SUMMARY OF INVENTION

With the foregoing background and prior art in mind, a principal object of the present invention is to provide a hand implement for gathering pine cones comprised of at least two adjacent spring-like fingers of resilient material so arranged as to spread apart upon being forced around a pine cone and firmly grip one or more pine cones so placed between such fingers. Another object of the invention is to provide a hand implement of the type described that can be operated to pick up pine cones from the ground by a person using only one hand while in an erect or standing position.

A further object of the invention is to provide a hand implement which is operable to successfully pick up a plurality of pine cones and firmly retain them within the implement for later removal to a storage or disposal container, such as a cloth bag worn by the user.

An additional object of the present invention is to provide a hand implement for picking up pine cones from the surface of a lawn which is economical to manufacture and reliable and efficient in use.

In addition to the numerous advantages apparent from the foregoing, the present invention has the further advantages of simplicity, ruggedness, durability, and ease of construction and manufacture. The implement disclosed can be constructed with relatively few parts, all of which are commercially available. The exact nature of the invention, as well as other objects and advantages thereof, will be readily apparent from the following specific description of the invention and from the annexed drawing.

DESCRIPTION OF DRAWINGS

For a better understanding of the present invention, reference is made to the accompanying drawing in which.

DETAILED DESCRIPTION OF INVENTION AND PREFERRED EMBODIMENT

Figure 1:
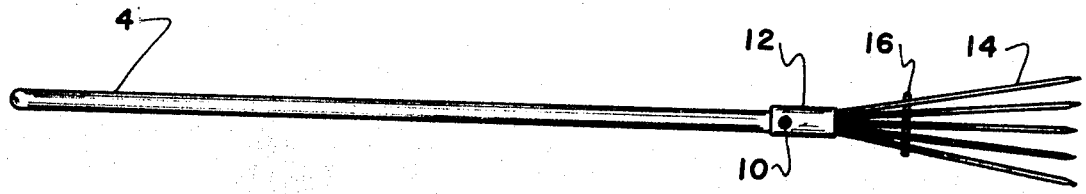
FIG. 1 is an overall plan view from one side of the implement in a plane perpendicular to the longitudinal plane through the axes of all resilient fingers.
Figure 2:
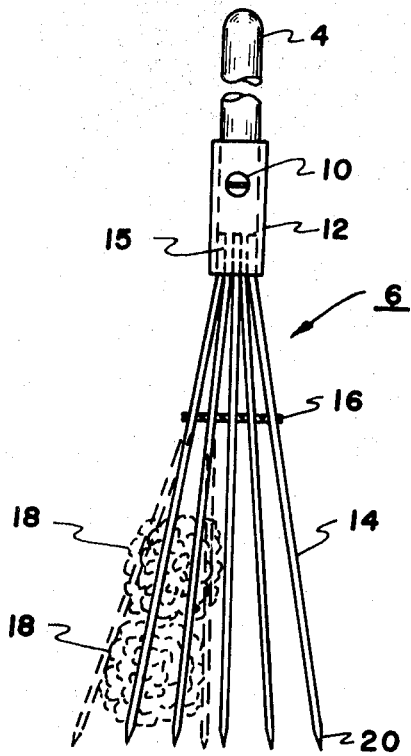
FIG. 2 is an enlarged plan view of the gathering mechanism of the implement from the same direction as FIG. 1.
Figure 3:
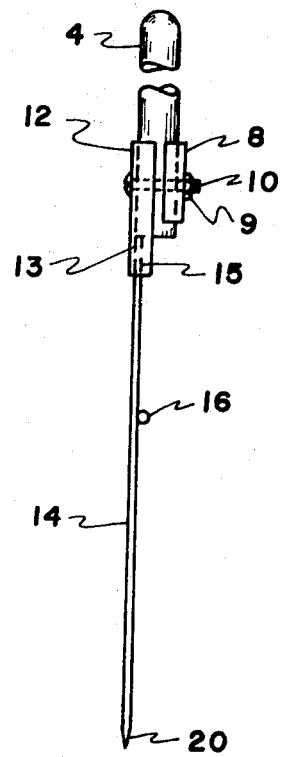
FIG. 3 is an enlarged side elevation of the gathering mechanism as viewed in the longitudinal plane through the axes of the resilient fingers and shows the means of connecting the gathering mechanism to the handle of the implement.

Referring now to the drawing and particularly to FIGS. 2 and 3 thereof, there is illustrated one form of the implement made according to the present invention. As shown best in FIG. 2, the implement may comprise an elongated handle member 4 and a gathering mechanism generally designated 6. The elongated member comprising the handle 4 may be made from a wooden rod of preferably round cross section, although other materials and other cross sections, such as hexagonal, may be satisfactorily employed. The handle 4 is of sufficient length to place the gathering mechanism in engagement with the ground when the implement is used by a person standing erect.

In the specific embodiment disclosed, the gathering mechanism 6 is rigidly secured to the working lower end of the handle 4 by means of an anchor bracket 8 fastened in place by a nut 9 and a bolt 10 extending through holes in the anchor bracket 8, the lower end of the handle 4, and the upper end of a channel member 12. The fastening elements 9 and 10 are of a standard variety and both the anchor bracket 8 and the channel member 12 are preferably made from short sections of standard U-shaped channels of steel stock. As shown in FIG. 3, anchor bracket 8 is approximately one-half the length of channel member 12.

The gathering mechanism 6 is comprised of channel member 12 secured to handle 4 as aforesaid, five (5) resilient finger members 14 operable to pick up and retain pine cones 18 as illustrated in FIG. 2, and tension bar 16 operable to brace and tension the finger members and perform other functions as hereinafter described. The upper end of channel member 12 is secured to handle 4 so that a portion thereof extends below the working end of the handle to form a seat area 13 defined by the inwardly projecting sides of the U-shaped channel. Each of the five finger members 14 is preferably formed from a resilient, spring-like steel rod of round cross section. The fingers are all of approximately equal length and have a blunt inner base portion 15 and a free outer end 20 tapered to a sharp point approximately on the longitudinal axis of the member. The base portions 15 of all finger members are gathered and rigidly secured together, as by spot welding, in a single plane and the gathered bases similarly secured to seat area 13 of channel member 12 in such a manner that the blunt end or base of each finger rests in the seat area adjacent to the lower working end of handle 4. The inwardly projecting channel edges may also be crimped over the base portions 15 of the fingers to further secure them to channel member 12. Beyond seat area 13, the respective finger members are bent in a single longitudinal plane common to the longitudinal finger axes as shown in FIG. 2 such that in the preferred embodiment the projecting portions of the fingers extending below channel member 12 diverge in the same longitudinal plane with an angle of approximately 4.5° between the adjacent rods. Rigidly secured, as by welding, to the inward side of all of the downwardly projecting fingers is a tension bar 16 comprised of a short length of resilient steel rod, preferably made of the same stock as the resilient fingers. The tension bar braces and maintains the fingers at the desired angle of divergence.

In the preferred embodiment, a round wooden handle 29 in. in length and 1 in. in diameter is used. The anchor bracket is made from a 1 ½ in. × 1 ⅛ in. U-shaped channel having ½ in. sides and the channel member is comprised of a 2 ¾ in. × 1 ⅛ in. U-shaped channel having ⅝ in. sides. Round steel rods 3/16 in. in diameter and 15 ¼ in. in length are used in making the finger members, and the tension bar is comprised of a 2 ¼ in. length of the same rod. The channel member 12 is attached by a 3/16 in. bolt and nut to the lower working end of the handle and placed so as to extend 1 in. below said end to form seat area 13. With a 1 in. base portion of each finger secured in said seat area, the diverging portions of said fingers are 14 ¼ in. long and the brace bar 16 is attached thereto at a point approximately 4 ¼ in. below the lower end of the channel member, i.e., 10 in. above the tips of the free ends. In the preferred embodiment, the pointed tips or lower ends of the fingers define an opening between adjacent fingers 1 ¼ in. in width as measured between the longitudinal axes of said members at their outer tip, the opening so defined being a function of the angle of divergence and the length of the projecting portion of the fingers. Angles of divergence in the range of 3° to 6° and opening distances between adjacent finger tips in the range of ¾ in. to 2 in. will produce satisfactory results. The angle of divergence as well as the distance between adjacent finger tips constitutes an important feature of the present invention as the angles and distances disclosed permit several pine cones of various sizes to be retained between two adjacent prongs as illustrated in FIG. 2. The relative size of the pine cones and the flexed position of the fingers as shown by dotted lines in FIG. 2 are somewhat exaggerated for purposes of clarity. It should also be noted that only two (2) finger members are required for operation of the device, although additional fingers increase the capacity of the device. Five (5) fingers as shown in the preferred embodiment is considered the optimum arrangement.

Another important feature of the present invention is the relative location of the tension bar 16 along the projecting length of the resilient finger members beyond the lower end of channel member 12. It has been found that the tension bar should be so placed that the ratio of the distance between the tension bar and the tip of the spring fingers to the distance between the tension bar and lower end of the channel member is less than 3. This location of the tension bar so fixes the resilience of the free ends of the fingers beyond the tension bar as to require a substantial amount of force to spread apart or "flex" adjacent fingers. The high tension generated in the free ends of the spring fingers when a pine cone is forced therebetween causes the fingers to tenaciously grip and retain pine cones picked up by the gathering mechanism. The gripping force so generated is sufficient to retain more than one pine cone between adjacent fingers such that at least eight pine cones can be accumulated in the gathering mechanism before removal of the pine cones from the device to another container is required. In using the device, one or more pine cones also may occasionally be stabbed by the sharp pointed ends of the fingers and such impalement allows yet additional pine cones to be gathered by the implement.

As a result of the expenditure of time and experimentation in testing every reasonable variation of the novel device disclosed, the one herein shown and recommended for use is by far the best for picking up pine cones of all shapes and sizes. In the optimum design of the device actually built, the tension bar was located approximately 10 inches above the tips of the fingers and approximately 4 inches below the end of the channel member to give a ratio of those distances of 2.5. As previously indicated, the value of that ratio should be kept to less than 3. However, smaller ratios may be used without appreciably altering the operation of the device, especially where the overall length of the fingers are increased and the free ends of the fingers beyond the tension bar are long enough to create a pocket to receive several pine cones. Ratios as low as 1.0 are operable where the angle of divergence and the spacing of finger tips are selected in accordance with the teaching of this invention.

In use, when it is desired to pick up pine cones or similarly shaped objects from a lawn or the like, a person grips the upper end of the handle 4 holding the implement in a downward direction with the gathering mechanism immediately above the ground surface. Two adjacent spring fingers of the gathering mechanism 6 are then placed over the pine cone so that it is disposed between the finger tips 20. The user then applies a downward directed pressure forcing the pine cone between the adjacent fingers so as to spread the fingers apart against the biasing or spring forces tending to return the distorted fingers to their rest position. This spreading or distorting movement places the fingers, together with the tension bar, in tension along their entire projecting length, both above and below the tension bar, and provides a tenacious gripping force causing the adjacent fingers to firmly engage roughly opposite portions of the pine cone and thereby retain the cone in the gathering mechanism.

As shown in FIG. 2, when additional pine cones are inserted in the opening between the same adjacent spring fingers, the pine cones successively move up into the converging pocket defined by the outwardly diverging fingers. The pine cones 18 are thus retained in the pocket by the gripping action of the tensioned fingers. The magnitude of the gripping force generated by the novel construction disclosed is due in part to the flexing of that portion of the fingers between the tension bar and the channel member and the flexing of the tension bar itself, in addition to the flexing, spring-like action of the free ends of the fingers.

When each of the four pockets created by the five diverging fingers are filled with two or more pine cones, in addition to such cones as may have been actually stabbed by the sharp points of the fingers, the hand implement is turned end for end and the pine cones manually removed from the gathering mechanism with a gloved hand by pushing the pine cones down and out of the pockets and into a disposal container. The pine cones removed from the implement may be deposited in any suitable receptacle, such as a wheelbarrow or trash can. However, to avoid bending over and to minimize the effort required for collecting pine cones, the use of a cloth bag or sack carried by the user is recommended when employing the present invention. A deep bag carried cross-wise over the shoulder similar to the bags of a mailman or newsboy is deemed preferable.

Transverse notches or ridges along the longitudinal length of the spring fingers can be used to enhance their gripping characteristics, although deep notches or sharp ridges prevent the pine cones from being readily removed from the gripping pocket. By adopting the novel design and construction shown, it was found that sufficient ripping forces were generated by the tensioned fingers alone to satisfactorily retain one or more pine cones within the pocket. The gripping action of adjacent fingers and their capacity to hold more than one cone are further improved by the fact that the relatively narrow fingers often pass between the pedals or leaves of the pine cones as shown in FIG. 2. While the implement is adapted primarily for collecting pine cones opened at least to some degree, it is within the contemplation of the present invention that it may be utilized to pick up closed pine cones and similarly shaped objects. The sharp prongs of the device also, of course, permit it to be used concurrently for picking up pine cones and for the collection of waste paper which may be stabbed with one or more fingers.

As the gathering mechanism is attached to the handle by a simple bolt and hole arrangement, the gathering mechanism may be constructed separately and used with a combination type handle. Thus, a handle might be employed where a standard rake implement could be substituted for the gathering mechanism of the instant invention. The gathering mechanism may also be easily disassembled for storage or transportation, or both. It is also within the scope of this invention that both the spring fingers and the handle of the implement may have cross sections other than circular, such as triangular, square or hexagonal.

Although but a single embodiment of the present invention has been described above, other embodiments and variations such as those suggested will occur to those skilled in the art. It is possible, of course, to use various features of the specific embodiment described, either separately or in various combinations, and such uses are within the contemplation of the present invention. Furthermore, many structural changes are possible as suggested above and such changes are intended to be within the scope of this disclosure.

I claim:

1. A hand implement for picking up cone shaped objects from the ground comprising:
    a. an elongated handle means having a grip portion at one end adapted for hand use and a working portion at the other end;
    b. at least two adjacent longitudinally extending and relatively narrow finger members of spring steel each having a base section positioned adjacent to the working end of said handle means and a straight outer section projecting outward from said working end;
    c. said base sections being contiguous and said outer sections diverging outwardly from each other at an angle equal to or greater than 3° in a plane common to their longitudinal axes and terminating in free outer ends;
    d. means for rigidly securing the base sections of said finger members to the working end of said handle means; and
    e. an elongated and relatively narrow tension bar of spring steel welded to the outer projecting section of each finger member so as to produce a rigid interconnection transmitting spring tension from said bar to said projecting sections upon lateral movement of the outer finger ends, said tension bar having substantially the same cross-sectional area as said finger members and the points of said interconnection being such that the ratio of the distance between said outer end and the tension bar to the distance between the base and the tension bar is in the range of 1.0 to 3.0.

2. A hand implement according to claim 1 wherein each of said outer free ends is tapered to a relatively sharp point approximately on the longitudinal axis of the finger member.

3. A hand implement according to claim 1 wherein the ratio of said outer finger distance to said inner finger distance has a value of substantially 2.5.

* * * * *